(12) United States Patent
Scothern et al.

(10) Patent No.: US 11,336,151 B2
(45) Date of Patent: May 17, 2022

(54) FLUID COOLING OF GREASE-PACKED BEARINGS

(71) Applicants: Rolls-Royce plc, London (GB); Rolls-Royce Corporation, Indianapolis, IN (US)

(72) Inventors: David Scothern, Mickleover (GB); Mark Boden, Belper (GB); Don Klemen, Carmel, IN (US); William Williamson, Indianapolis, IN (US); Brian Maners, Cloverdale, IN (US)

(73) Assignees: ROLLS-ROYCE PLC, London (GB); ROLLS-ROYCE CORPORATION, Indianapolis, IN (US)

( * ) Notice: Subject to any disclaimer, the term of this patent is extended or adjusted under 35 U.S.C. 154(b) by 142 days.

(21) Appl. No.: 16/404,396

(22) Filed: May 6, 2019

(65) Prior Publication Data
US 2020/0358337 A1 Nov. 12, 2020

(51) Int. Cl.
| | | |
|---|---|---|
| *H02K 9/19* | (2006.01) | |
| *H02K 5/173* | (2006.01) | |
| *H02K 5/20* | (2006.01) | |

(52) U.S. Cl.
CPC ............... *H02K 9/19* (2013.01); *H02K 5/173* (2013.01); *H02K 5/20* (2013.01)

(58) Field of Classification Search
USPC ...................................................... 310/52–65
See application file for complete search history.

(56) References Cited

U.S. PATENT DOCUMENTS

| | | | |
|---|---|---|---|
| 3,743,867 A | 7/1973 | Smith, Jr. | |
| 5,293,089 A | 3/1994 | Frister | |
| 5,798,593 A | 8/1998 | Salter, II et al. | |
| 5,969,446 A | 10/1999 | Eisenhaure et al. | |

(Continued)

FOREIGN PATENT DOCUMENTS

| | | |
|---|---|---|
| DE | 262265 A1 | 11/1988 |
| DE | 102006015571 A1 | 10/2007 |

(Continued)

OTHER PUBLICATIONS

Machine translation of DD 262265 A1 (Year: 1988).*

(Continued)

*Primary Examiner* — Quyen P Leung
*Assistant Examiner* — Minki Chang
(74) *Attorney, Agent, or Firm* — Crowell & Moring LLP

(57) ABSTRACT

An electric starter-generator is described. The generator may comprise a rotor, a housing, two bearings, a stator, and a cooling-fluid flowpath. The cooling-fluid flowpath may comprise a cooling-fluid entrance and exit, and a cooling-fluid channel in fluid communication with the entrance and exit. At least a portion of the channel may be defined by a fluid-tight coupling of the housing and a sleeve radially surrounding the outer race of either the bearings. The portion may form an annulus about the axis. The portion may comprise a radially inner surface defined by the sleeve, a radially outer surface define by said housing, and two axial surfaces. The two axial surfaces may extend a distance from the radially inner to outer surfaces that is less than a distance from one of the two axial surfaces to the other of the two axial surfaces.

16 Claims, 17 Drawing Sheets

(56) References Cited

U.S. PATENT DOCUMENTS

| | | |
|---|---|---|
| 6,293,769 B1 | 9/2001 | Radermacher et al. |
| 7,208,854 B1 | 4/2007 | Saban et al. |
| 7,994,668 B2 | 8/2011 | Gerstler et al. |
| 8,541,914 B2 | 9/2013 | Knight et al. |
| 8,633,624 B2 | 1/2014 | Knight et al. |
| 8,760,015 B2 | 6/2014 | Himmelmann |
| 8,847,444 B2 | 9/2014 | Himmelmann |
| 8,970,075 B2 | 3/2015 | Rippel et al. |
| 9,006,942 B2 | 4/2015 | Lemmers, Jr. et al. |
| 9,083,215 B2 | 7/2015 | Tsuboi |
| 9,203,271 B2 | 12/2015 | Inoue et al. |
| 9,796,944 B2 | 10/2017 | Mikami et al. |
| 9,985,500 B2 | 5/2018 | Rippel et al. |
| 2011/0298315 A1 | 12/2011 | Fulton |
| 2012/0049665 A1* | 3/2012 | Garriga ............... F16C 35/042 310/54 |
| 2014/0203673 A1 | 7/2014 | Knight et al. |
| 2014/0333154 A1 | 11/2014 | Shin et al. |
| 2015/0188367 A1 | 7/2015 | Vander Lind et al. |
| 2016/0013705 A1 | 1/2016 | Takei |
| 2016/0237964 A1 | 8/2016 | Huscher |
| 2018/0091011 A1 | 3/2018 | Higashino et al. |
| 2018/0212494 A1* | 7/2018 | Schochlow ............... H02K 9/19 |
| 2018/0337571 A1 | 11/2018 | Pal |
| 2019/0003572 A1 | 1/2019 | Dellal et al. |

FOREIGN PATENT DOCUMENTS

| | | | |
|---|---|---|---|
| EP | 3 112 061 A1 | | 1/2017 |
| JP | 2017145724 A | * | 8/2017 |
| JP | 2017145724 A2 | | 8/2017 |

OTHER PUBLICATIONS

Machine translation of JP 2017145724 A.*

Extended European Search Report, dated Oct. 16, 2020, pp. 1-9, issued in European Patent Application No. 20170295.8, European Patent Office, The Hague, Rijswijk, Netherlands.

Staton, D. et al., Motor Design Limit (MDL), Motor Design Software by Motor Design Engineers, "Open Source Electric Motor Models for Commercial EV & Hybrid Traction Motors", CWIEME 2017 (Berlin), 89 pgs.

* cited by examiner

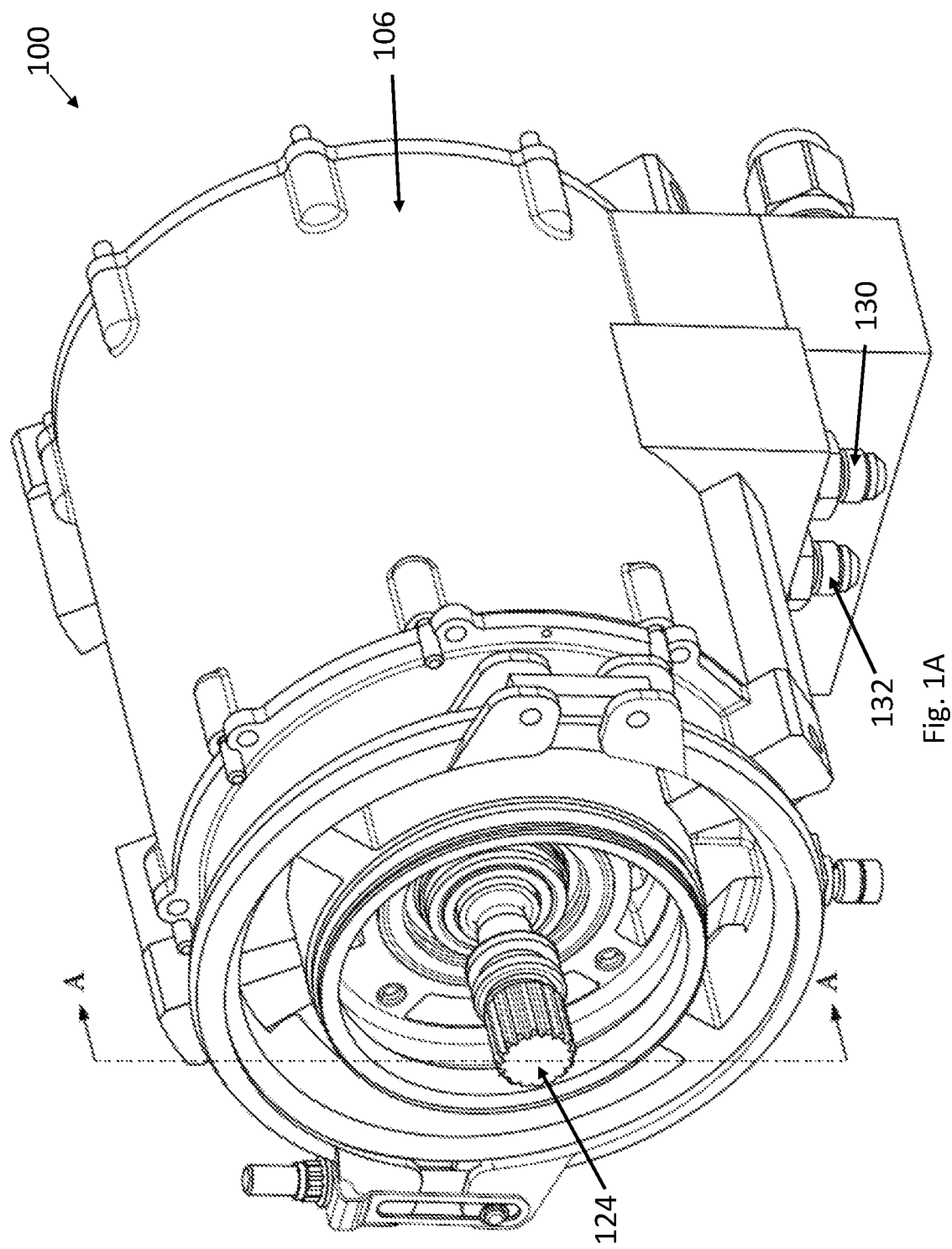

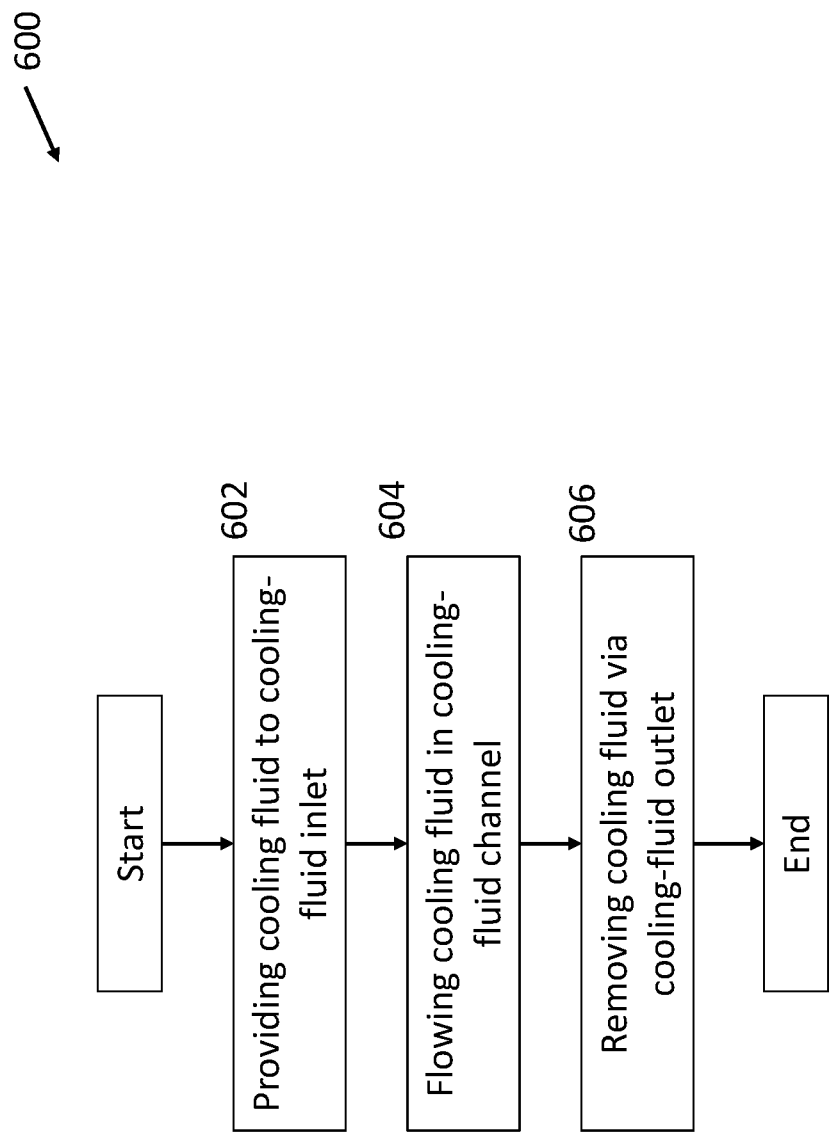

FLUID COOLING OF GREASE-PACKED BEARINGS

BACKGROUND

Efficient cooling of an electric generator is required in order to maximize the power generation of these machines. Heat is generated in an electric generator in both the stator and the rotor. Heat may be generated by permanent magnets and/or current passing through the generator windings (e.g., field and armature coils). In some cases, heat may also be transferred from the generator prime mover to the generator itself via a common rotor or some other transmission path. Heat may also be generated due to friction occurring at, e.g., seals and bearings.

In many aerospace applications, generator heat is removed via an oil system. The oil is typically pumped from an oil supply pump via interconnecting lines to the generator and its subcomponents, e.g., bearings, for cooling. Some components, like the bearings, may also be lubricated by the oil. The oil may return to a sump, from which it is collected by scavenging pumps and returned to the oil supply. The oil system may also include heat exchanger, e.g., an oil-to-fuel heat exchanger, to which the oil may dump heat received from the generator. The oil and oil system supporting the generator adds additional weight to the over engine, adds additional components and complexity (such as those listed above in addition to others, e.g., seals), and introduces losses, e.g., from oil churn.

Additionally, many aerospace applications use field-wound generators. Increased power density may be achieved by using permanent magnet generators. However, increased power densities may require more cooling. Existing aerospace engines are designed with little or no additional cooling capacity from oil-system.

Some bearings, e.g., grease-packed bearings, do not require externally supplied oil for cooling and/or lubrication. However, these bearings may be sensitive to high temperatures. High temperatures may result from friction (either at the bearings or seals for the bearing) due the high speed of rotation of the shaft(s) to which the bearing is coupled, as well as from heat generated by the generator (e.g., magnetic losses in the iron due to hysteresis, eddy current, and excess loss) and/or its prime mover (e.g., a turbine).

Improvements are needed in the systems and methods used to cool electric generators and their components.

SUMMARY

According to some aspects of the present disclosure, an electric starter-generator is provided. The generator may comprise a rotor, a housing, a first and second bearing, a stator, and a cooling-fluid flowpath. The rotor may have an axis of rotation. The housing may have a first end, a second end, and a center portion extending from the first end the second end. The center portion may be located radially outward of the rotor. The first bearing may be an enclosed bearing and may rotationally couple the rotor the first end of the housing. The second bearing may be an enclosed bearing and may rotationally couple the rotor to the second end of the housing. Each of the first and second bearings may comprise an inner race coupled to the rotor, an outer race coupled to the housing, and a plurality of rolling element bearings between and in rotational contact with the inner and outer races. The stator may be rigidly coupled to the housing. The cooling-fluid flowpath may comprise a cooling-fluid entrance, a cooling-fluid exit, and a cooling-fluid channel in fluid communication with the entrance and exit. At least a portion of the cooling-fluid channel may be defined by a fluid-tight coupling of the housing and a sleeve radially surrounding the outer race of either of said first and second enclosed bearings. The portion may form an annulus about the axis. The portion may comprise a radially inner surface defined by the sleeve, a radially outer surface define by said housing, and two axial surfaces extending from the radially inner surface to the radially outer surface, wherein both of the radially inner and outer surfaces extend from one of the two axial surfaces to the other of the two axial surfaces without interruption. The two axial surfaces may extend a distance from the radially inner to outer surfaces that is less than a distance from one of the two axial surfaces to the other of the two axial surfaces.

According to some aspects of the present disclosure, an electric starter-generator is provided. The generator may comprise a rotor, a housing, a first and second bearings, a stator, and a cooling-fluid flowpath. The rotor may have an axis of rotation. The housing may have a first end, a second end, and a center portion extending from the first end the second end. The center portion may be located radially outward of the rotor. The first bearing may be an enclosed bearing, and may rotationally couple the rotor the first end of the housing. The second bearing may be an enclosed bearing, and may rotationally couple the rotor to the second end of the housing. Each of the first and second bearings may comprise an inner race coupled to the rotor, an outer race coupled to the housing, and a plurality of rolling element bearings between and in rotational contact with the inner and outer races. The stator may be rigidly coupled to the housing. The cooling-fluid flowpath may comprise a cooling-fluid entrance, a cooling-fluid exit, and a cooling-fluid channel in fluid communication with the entrance and exit. At least a portion of the cooling-fluid channel may be defined by a fluid-tight coupling of the housing and a sleeve radially surrounding the outer race of either of said first and second enclosed bearings. The portion may form an annulus about the axis. The portion may comprise a radially inner surface defined by the sleeve, a radially outer surface define by said housing, and two axial surfaces extending from the radially inner surface to the radially outer surface, wherein both of the radially inner and outer surfaces extend from one of the two axial surfaces to the other of the two axial surfaces without interruption. The radially outer surface may be located radially inward of said stator.

According to some aspects of the present disclosure, a method of cooling an electric generator is provided. The electric generator may have a cooling-fluid flowpath comprising a cooling-fluid entrance, a cooling-fluid exit, and a cooling-fluid channel in fluid communication with the cooling-fluid entrance and cooling-fluid exit. The cooling-fluid channel may be disposed radially outward of a portion of and in thermal communication with an enclosed bearing of the generator. The cooling-fluid channel may be configured to maintain a cooling fluid in the cooling-fluid channel radially inward of a stator of said generator. The method may comprising providing a cooling fluid to said cooling-fluid entrance, flowing said cooling fluid in said cooling-fluid channel, and removing said cooling fluid via said cooling-fluid exit.

BRIEF DESCRIPTION OF THE DRAWINGS

The following will be apparent from elements of the figures, which are provided for illustrative purposes.

FIG. 1A is a perspective view of a generator in accordance with some embodiments.

FIG. 6 illustrates a method of cooling a generator in accordance with some embodiments.

Figure 1B:
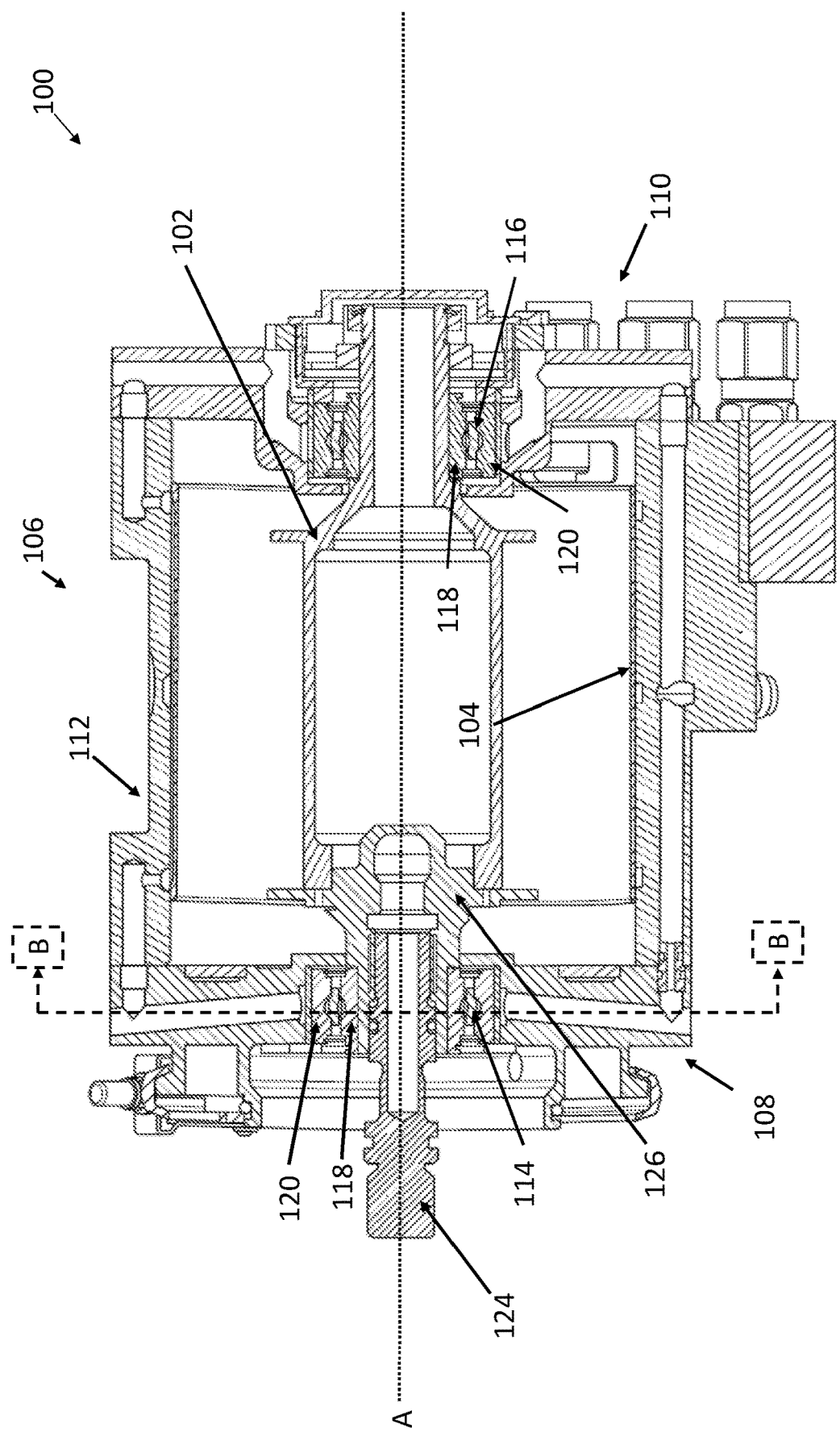
FIGS. 1B and 1C are 'A-A' cross sections of the generator of FIG. 1A in accordance with some embodiments.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

Figure 1C:
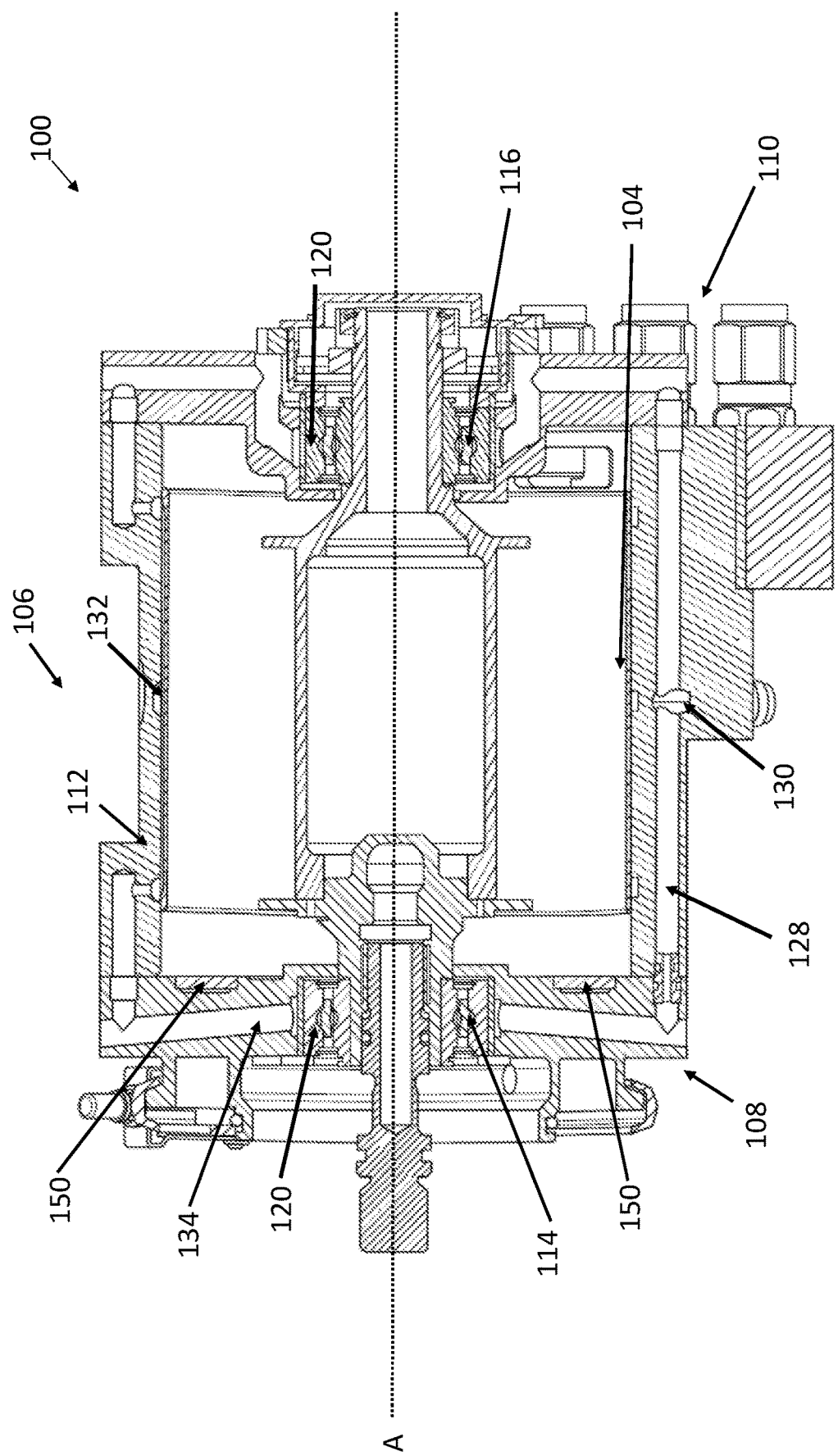

In accordance with some embodiments, a generator 100 is provided in FIG. 1A to FIG. 1J. FIG. 1A provides a perspective view of the generator 100. As shown, the generator 100 may have a housing 106, input shaft 124, cooling-fluid inlet 130, and cooling fluid outlet 132. FIGS. 1B and 1C provided cross section view of the generator 100 taken along 'A-A' as show in FIG. 1A. As can be seen, generator 100 may comprise a rotor 102 that rotates about axis 'A', stator 104, housing 106, bearing 114, bearing 116, input shaft 124, coupling 126, cooling-fluid flowpath 128, cooling-fluid inlet 130 and cooling-fluid outlet 132.

As shown in FIG. 1B, rotor 102 may rotate about the axis 'A' of generator 100. Rotor 102 may be coupled to an input shaft 124 via coupling 126. The input shaft 124 may be coupled to a prime mover, e.g., a gas turbine engine, that provides the work input necessary for generator 100 to provide an electric power output. Rotor 102 rotates within housing 106 relative to stator 104. As will be appreciated, various arrangements of field windings/permanent magnets and armature coils may be placed on rotor 102 and stator 104 (for simplicity of the figures, neither the permanent magnets/field windings and armature coils are illustrated). For example, rotor 102 may have attached thereto permanent magnets/field windings and the armature coils may be arranged in the stator 104. In some embodiments, these locations may be reversed, with the armature coils being attached to the rotor 102 and the permanent magnets/field windings being arranged in the stator 104. Generator 100 may be either an AC or a DC generator.

Figure 5:
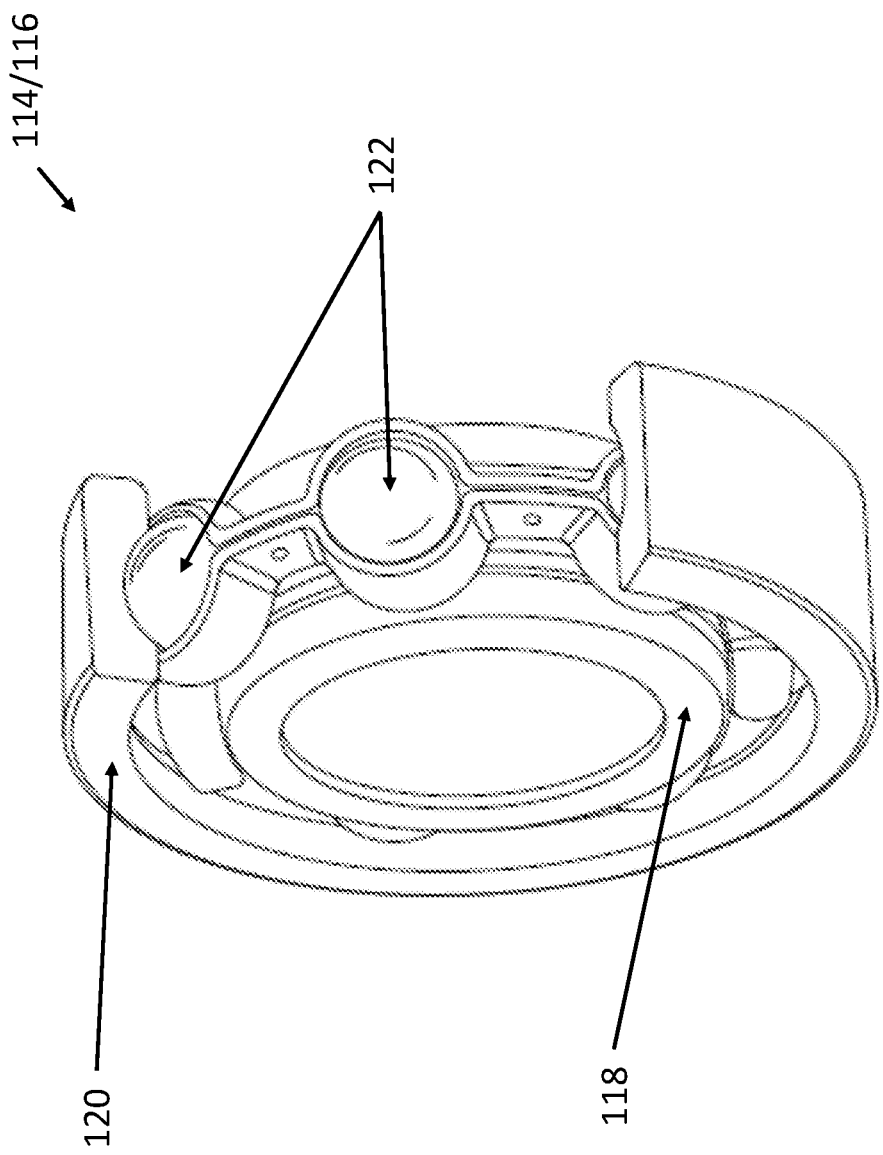
FIG. 5 illustrates a bearing in accordance with some embodiments.

Rotor 102 is rotationally coupled to the housing 106 via bearings 114, bearing 116. Stator 104 is rigidly attached to housing 106. Bearing 114 may be located in one end 108 of housing 106 and bearing 116 may be located in another end 110 of housing 106. FIG. 5 illustrates an example of a bearing, such as bearings 114 and 116. Bearings 114 and 116 may each have an inner race 118, an outer race 120 and a plurality of ball bearings 122 located between the inner race 118 and outer race 120. With reference to FIG. 1B, the inner race 118 of each bearing 114 and 116 may be rigidly coupled to rotor 102 and the outer race 120 of each bearings 114 and 116 may be rigidly coupled to housing 106, e.g., to end 108 and end 110, respectively. In some embodiments, bearings 114 and 116 may be coupled to the housings with a slight clearance fit.

In some embodiments, bearings 114 and 116 are press fit into the housing. In some embodiments, bearings 114 and 116 may be coupled to a thermally conducted sleeve 121 (labeled, e.g. in FIGS. 1D-1F) that seals channel 134 (described, e.g., in FIG. 1C). The ball bearings 122 rotationally coupled the rotor 102 and housing 106 while providing radial (and possibly axial) support.

As shown in FIG. 1B, in some embodiments, inner race of 118 of bearing 114 may be rigidly coupled to shaft coupling 126 that is rigidity coupled to rotor 102. As should be understood bearings 114 and 116 may not be in direct contact with rotor 102, but they must be in contact with a component that is rigidly coupled to rotor 102 in order to provide their support function.

While bearings 114 and 116 as illustrated in FIG. 5 use ball bearings 122, one of ordinary skill will recognize that other types of rolling-element bearings (e.g., ball, cylindrical, spherical, tapered, etc.) may be used to provide rotational support of rotor 102. Further, bearings 114 and 116 may be deep groove or angular bearings. Bearings 114 and 116 may be lubricated by various means, e.g., by a fluid lubricant, grease, or other type. Bearings 114 and 116 may be enclosed bearings (e.g., sealed or shielded) that are packed with a lubricating medium. Sealed bearings provide greater resistance to the loss of the lubricating medium than shielded bearings. However, sealed bearings generate heat because the seal is required to contact portions of the bearing that have relative motion therebetween, thereby creating heat by friction. Shielded bearings do not contact two or more portions of the bearing having relative motion therebetween. While the lubricating medium may be lost more easily from a shielded bearing than a sealed bearing, this disadvantage may be minimal, particular in view of means to replace the lubricating medium and lower heat generation of shielded bearings.

During operation, heat may be removed from generator 100, which may improve the efficiency of the generator. As described above, this heat may result from the electric current losses in the various windings, friction with the air in which the generator is rotated or from within the bearings, or transferred to the generator from other components, e.g., the prime move, directly or through other components, such as input shaft 124.

Figure 1D:
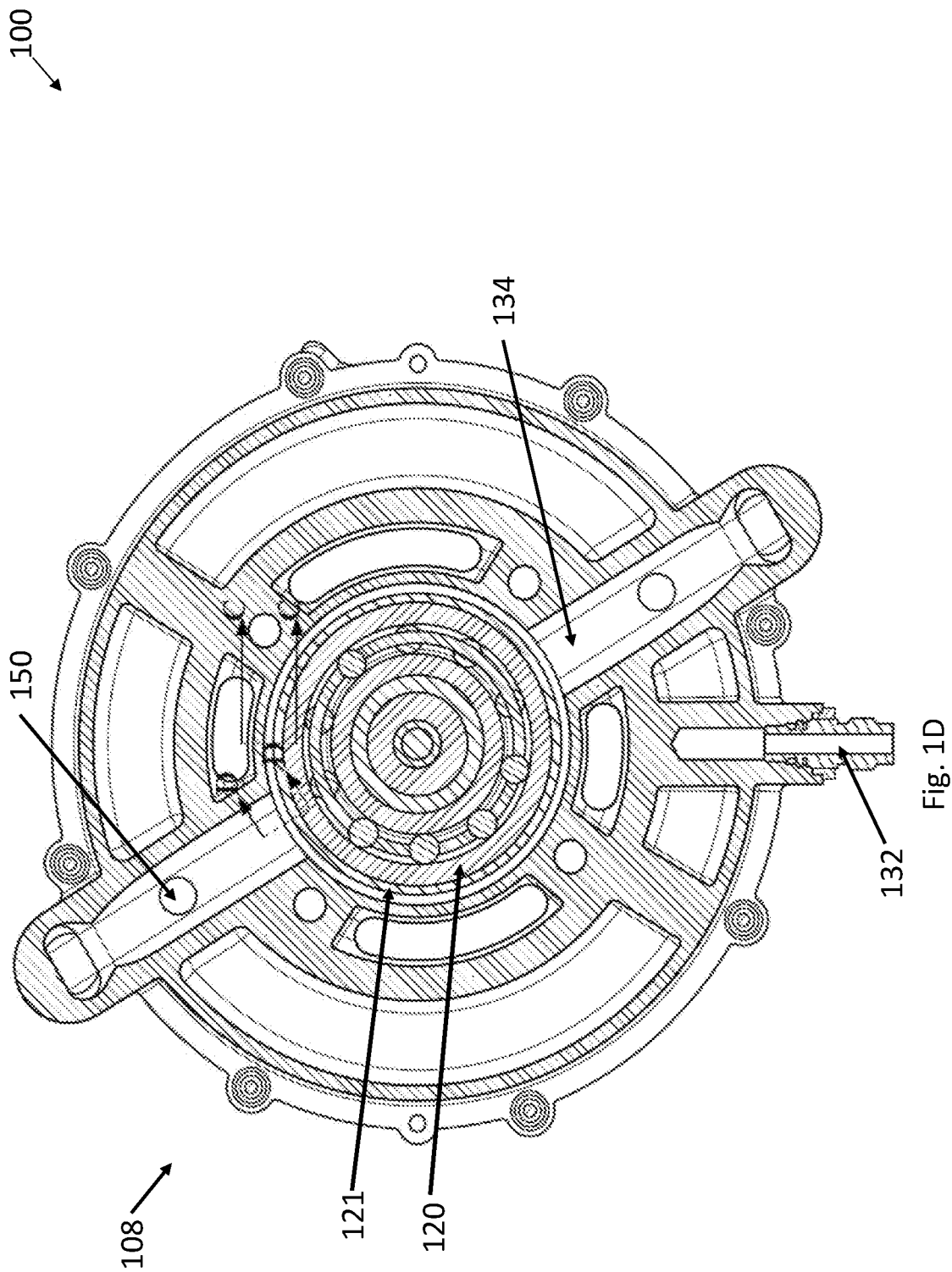
FIG. 1D is the 'B-B' cross section of the generator of FIGS. 1B and 1C in accordance with some embodiments.

To remove heat from generator 100, housing 106 defines cooling-fluid flowpath 128 (see FIG. 1C) that directs the flow of a cooling-fluid to, through, and from generator 100. Cooling fluid flowpath 128 starts and a cooling-fluid inlet 130 and ends at cooling-fluid outlet 132. Between the inlet 130 and outlet 132, cooling fluid flowpath 128 may define several channels, e.g., cooling-fluid channel 134. As can be seen in FIGS. 1C and 1D, cooling-fluid channel 134 directs a cooling-fluid from a radially outer channel (e.g. channel 142 described below) toward a bearing, e.g., bearing 114. Channel 134 then defines an annular passage (described below) located just radially outward of bearing 114 at least a portion of the circumference. Channel 134 then directs the cooling fluid radially outward toward another channel, e.g., channel 142.

Figure 1F:
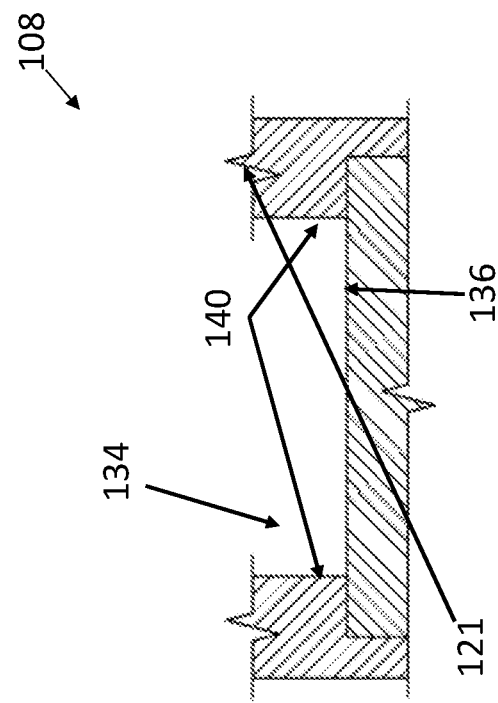
FIGS. 1E and 1F are the 'C-C' and 'D-D' cross sections of the generator of FIG. 1D in accordance with some embodiments.
Figure 1E:
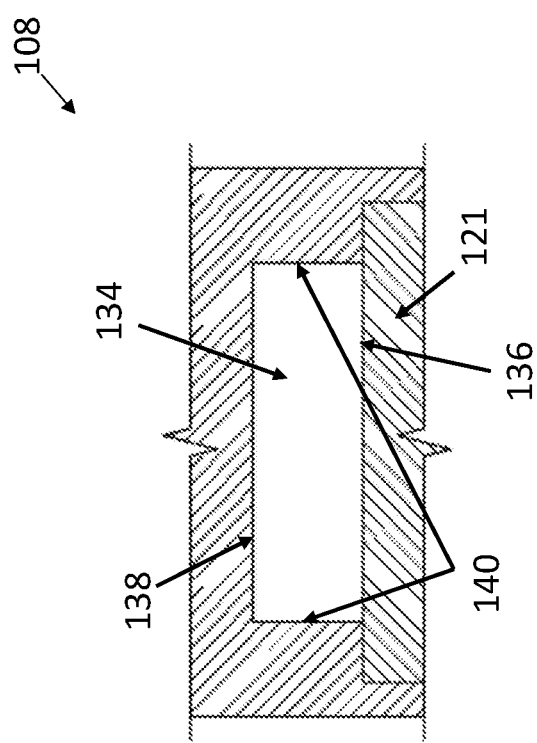

The annular passage formed by channel 134 is configured to bring the cooling fluid in close proximity to bearing 114 (and, likewise, bearing 116 in end 110) such that heat generated therein may be removed. FIGS. 1E and 1F are close-ups of two cross sections ('C-C' and 'D-D', respectively) taken from FIG. 1G that illustrate the channel 134 in greater detail. As can be seen, the annular passage of channel 134 is defined by end 108 of housing 106 and the sleeve 121. Sleeve 121 forms the radially inner surface 136 of the annular passage, and end 108 forms axial surfaces 140 and the radially outer surface 138. As can be seen, the FIG. 1F does not have the radially outer surface 138 as seen in FIG. 1E because the 'D-D' cross section is taken where channel 134 defines the radially outward passage that moves the cooling fluid radially outward from the bearing 114. The radially inner surface 136 and radially outer surface 138 may extend, without interruption, from one of the axial surfaces 140 to the other of the axial surfaces 140, except, as described above, in a location in which the cooling fluid exists the annular passage.

Housing end 108 and sleeve 121 may define a fluid-tight passage such that no cooling fluid is allowed to flow to the rolling-element bearings 122 of bearing 114. This is particularly advantageous where bearing 114 is a grease-packed bearing, and the introduction of cooling fluid may strip bearing 114 of all or a portion of its lubricating grease.

In some embodiments, outer race 120 may form the inner surface 136 of annular passage of channel 134.

As can been seen in FIG. 1E, the axial surfaces 140 extend radially outward from the radially inner surface 136 a distance that is less than the axial distance alone which the radially outer surface 138 and radially inner surface 136 extend between the axial surfaces 140. This relatively short (in radial direction), wide (in the axial direction) annular passage may form a long (circumferentially) passage that effectively constrains the cooling fluid to close proximity to the bearing 114 (or 116), to thereby provide better thermal communication with it. This annular passage may direct the flow of the cooling fluid around and in close proximity to the bearing 114 (or 116) at a radial position that is inward of the stator 104 and, in some embodiments, radially inward of rotor 102 (e.g., a shaft forming rotor 102, or the windings or magnets attached thereto).

Figure 2:
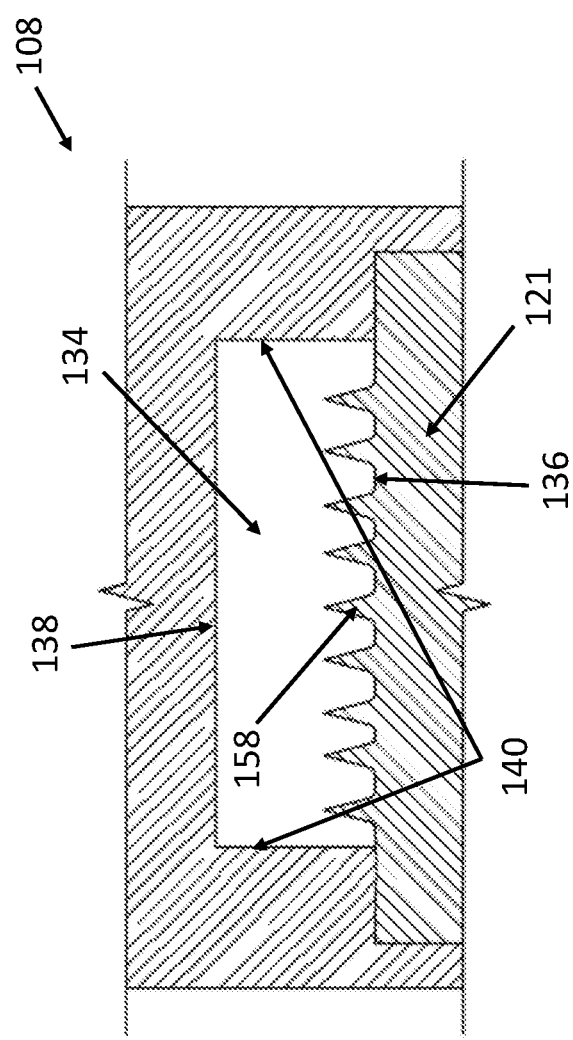
FIG. 2 illustrates a cooling-fluid channel in accordance with some embodiments.
Figure 3A:
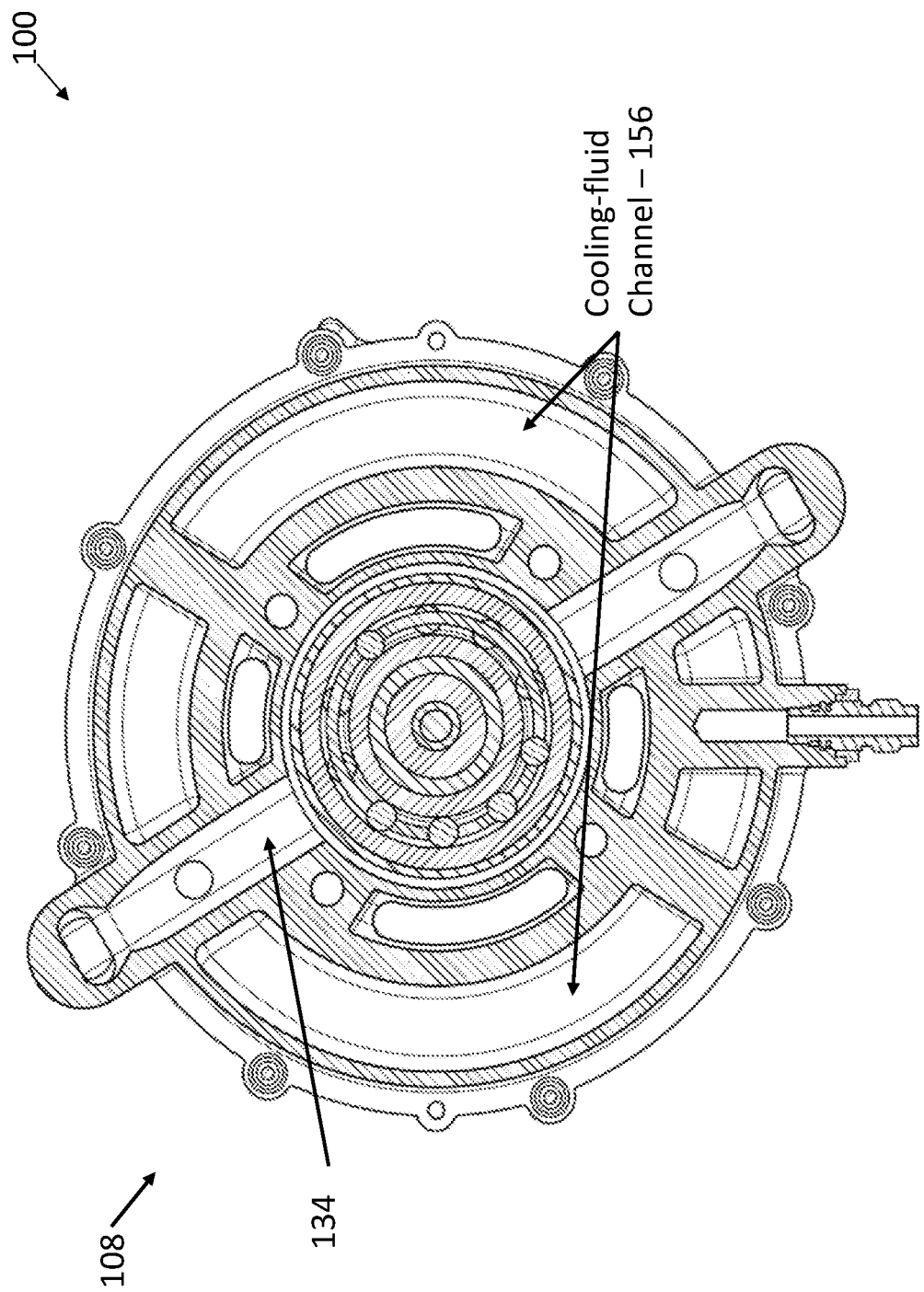
FIGS. 3A and 3B illustrates cooling-fluid channels in accordance with some embodiments.
Figure 3B:
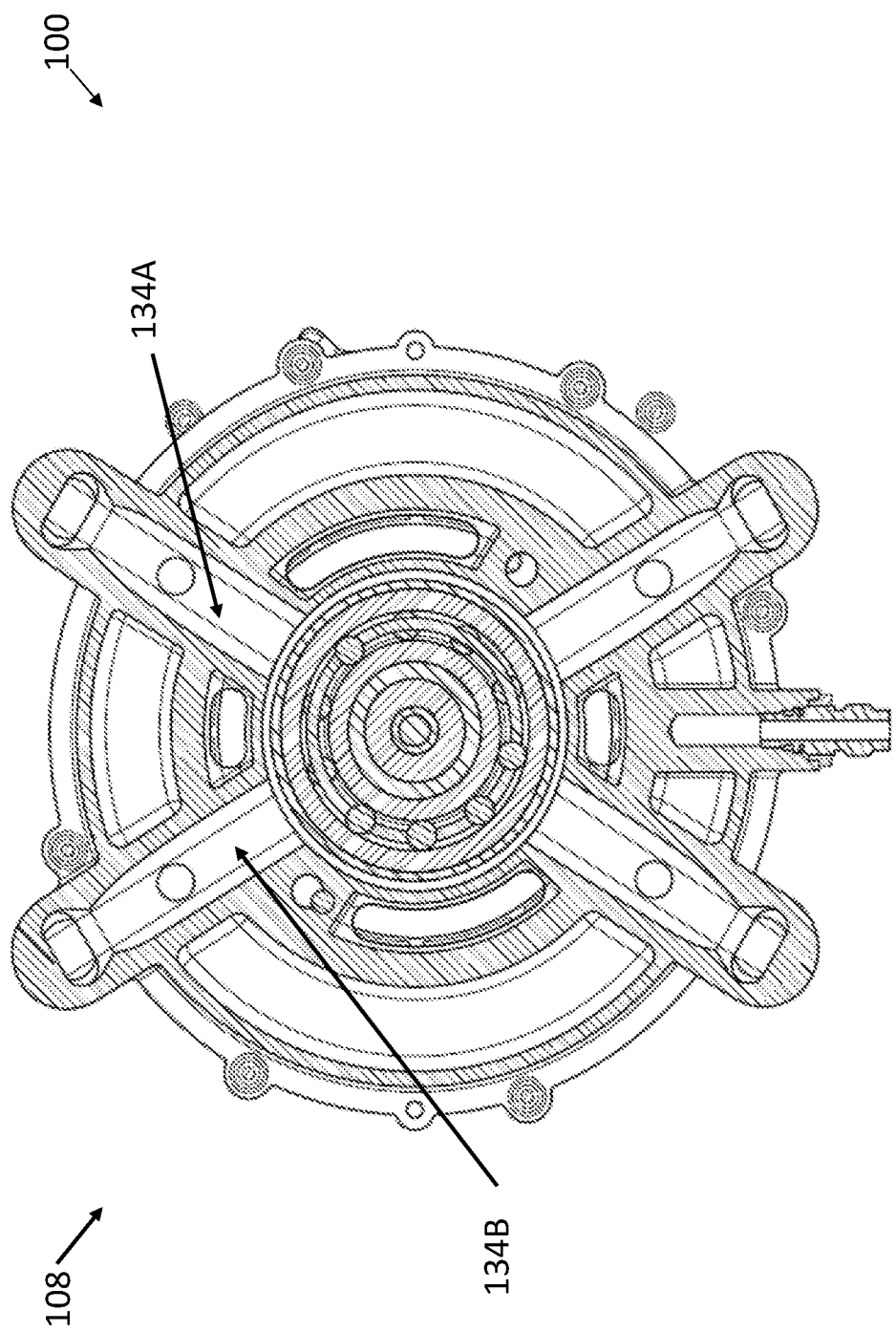

In accordance with some embodiments, an annular passage of channel 134 is provided in FIG. 2. The passage of channel 134 may comprise the bearing outer race 120, housing 106 end 108, radially inner surface 136, radially outer surface 138, and axial surfaces 140 as described above. Radially inner surface 136 may comprise further structures, e.g., fins 158, that increase the surface area with which the cooling fluid is in contact, thereby promoting easier heat transfer between the outer race 120 of bearing 114 and the cooling fluid medium In accordance with some embodiments housing 106 ends, e.g. end 108, may comprise additional cooling fluid channels, e.g., channel 156, configured to remove heat from generator 100 as shown FIG. 3A. Channel 156 may provide a pathway around the circumference of generator 100 at a location radially outward of bearing 114. For example, channel 156 may be aligned with stator 104 to aid in removal of heat therefrom. Channel 156 may also define additional thermal communication ports 150 (not shown) around the periphery of the generator 100.

In accordance with some embodiments, generator 100 may comprise two or more channels 134A and 134B. Each channel 134A and 134B has a separate flowpath to and from a radial outer portion of the generator 100 for the cooling fluid. In some embodiments, each channel 134A and 134B may be supplied and discharge the cooling fluid to a common source. In some embodiments, each channel 134A and 134B may be supplied with and discharge the cooling fluid to a separate source. In such embodiments, generator 100 may comprise two or more cooling fluid inlets and outlets 130 and 132. In some embodiments, Channels 134A and 134B may be joined in the annular passage adjacent to the bearings 114 and 116. In some embodiments, the channels may be separated such that no fluid from channel 134A mixes with the fluid from channel 134B either when the fluid is within the housing or whenever the fluid is in any channel within the generator 100.

As the cooling fluid flows radially toward or away from the above-described annular passage, heat from the electric generating components, e.g. the rotor 102 and stator 104, may be communicated to the cooling fluid flowing in channel 134. Additionally, channel 134 may define one or more thermal communication openings/ports 150 that expose the cooling fluid to a portion of the electric generating components, e.g., stator 104. This exposure enhances the rate of heat transfer into the cooling fluid when it is flowing through the housing ends 108 and 110.

Figure 1G:
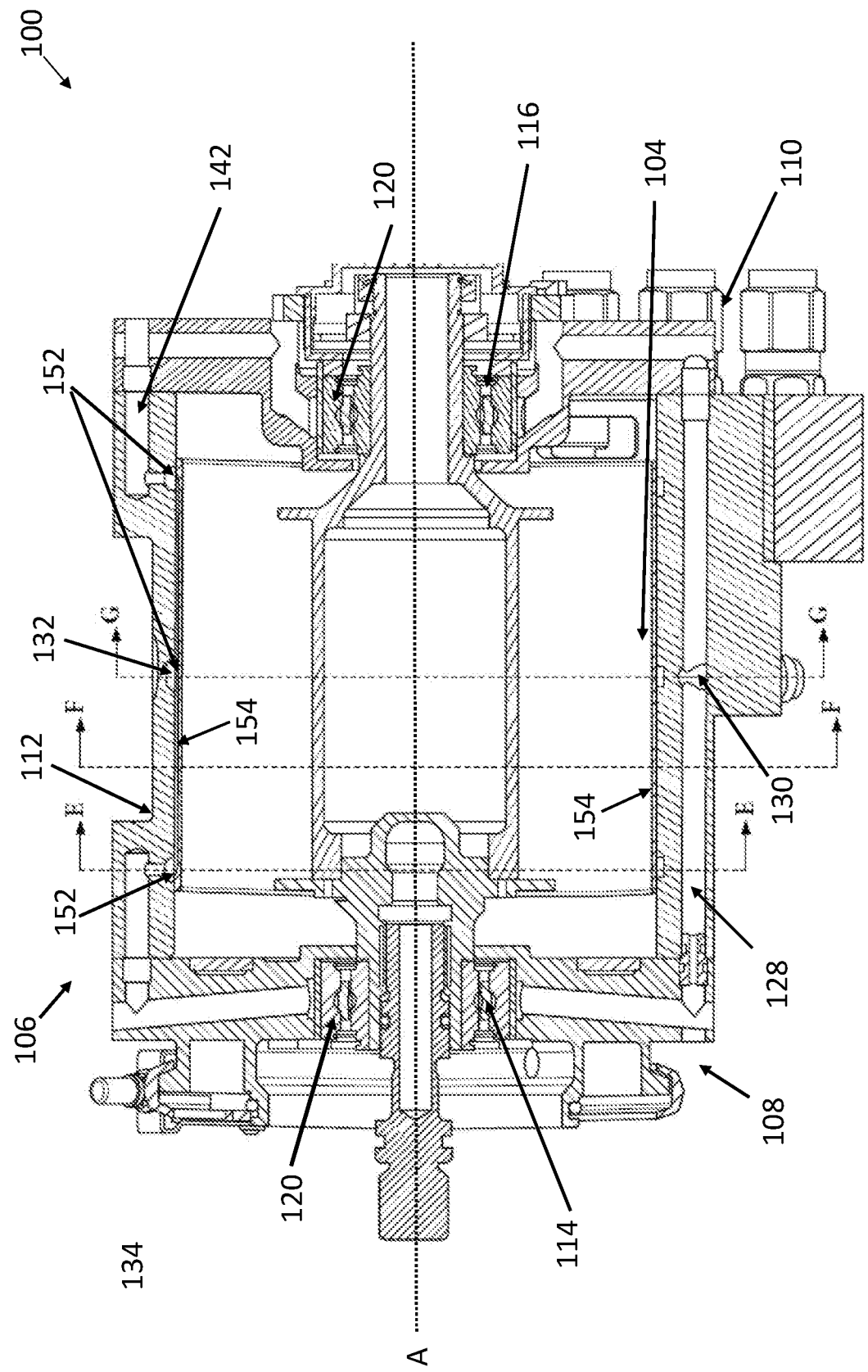
FIG. 1G is an 'A-A' cross section of the generator of FIG. 1A in accordance with some embodiments.

Cooling of the electric power generating portions of generator 100 may be achieved by additional cooling-fluid channels, e.g., channel 142 as shown in FIG. 1G. In some embodiments, housing 106 comprises a central portion 112 that radially surrounds the stator 104 and rotor 102 and extends between housing ends 108 and 110. The central portion 112 may define channel 142 and provide for an interface between channel 142 and channel 134. Further, the central portion 112 may provide for the interface between channel 142 and both the cooling fluid inlet 130 and outlet 132. Channel 142 is in thermal communication with the stator 104 and removes heat therefrom.

Figure 1H:
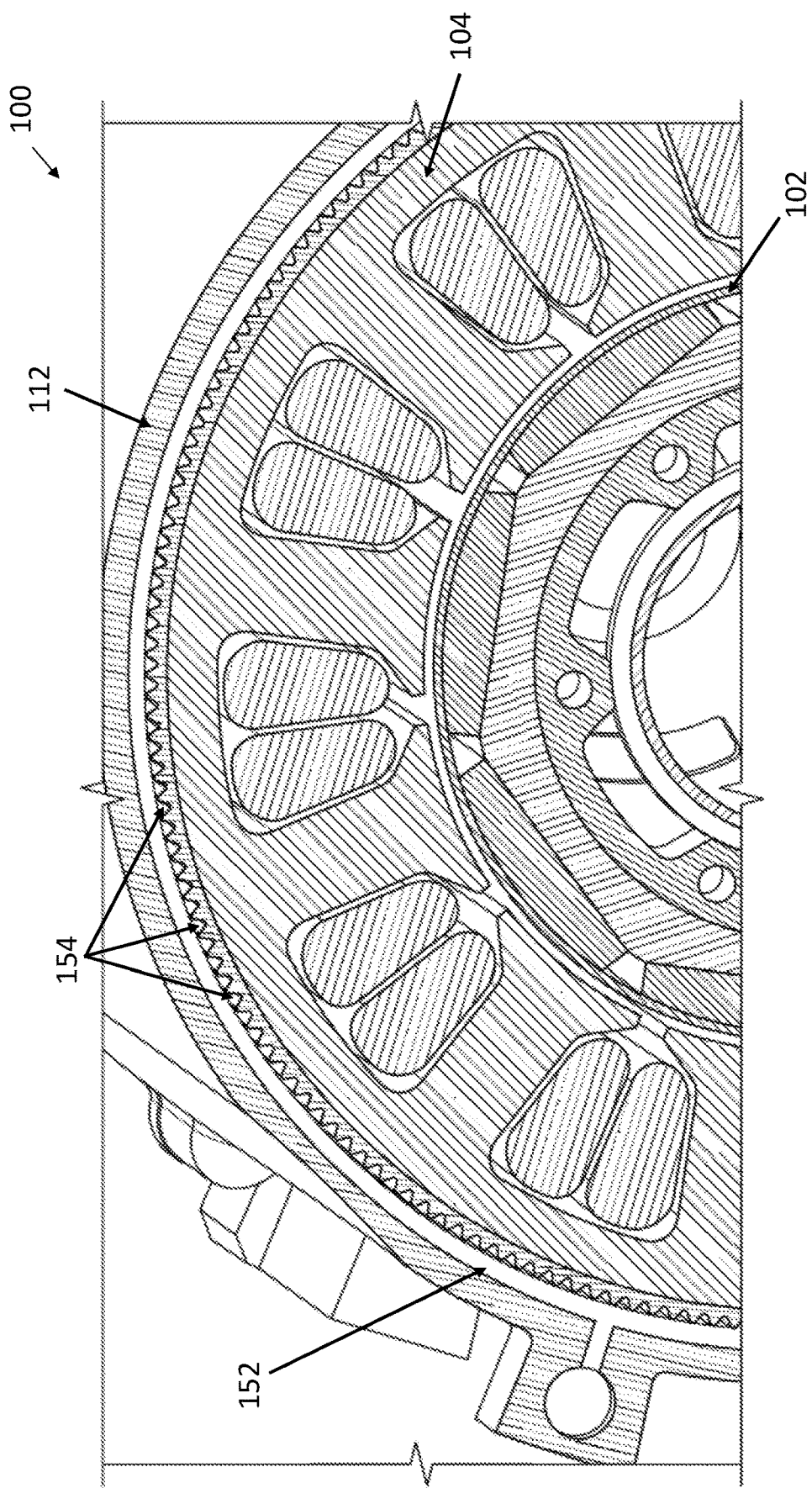
FIGS. 1H, 1I, and 1J are perspective views of cross sections of the generator of FIG. 1G taken at 'E-E', 'F-F' and 'G-G', respectively, in accordance with some embodiments.
Figure 1I:
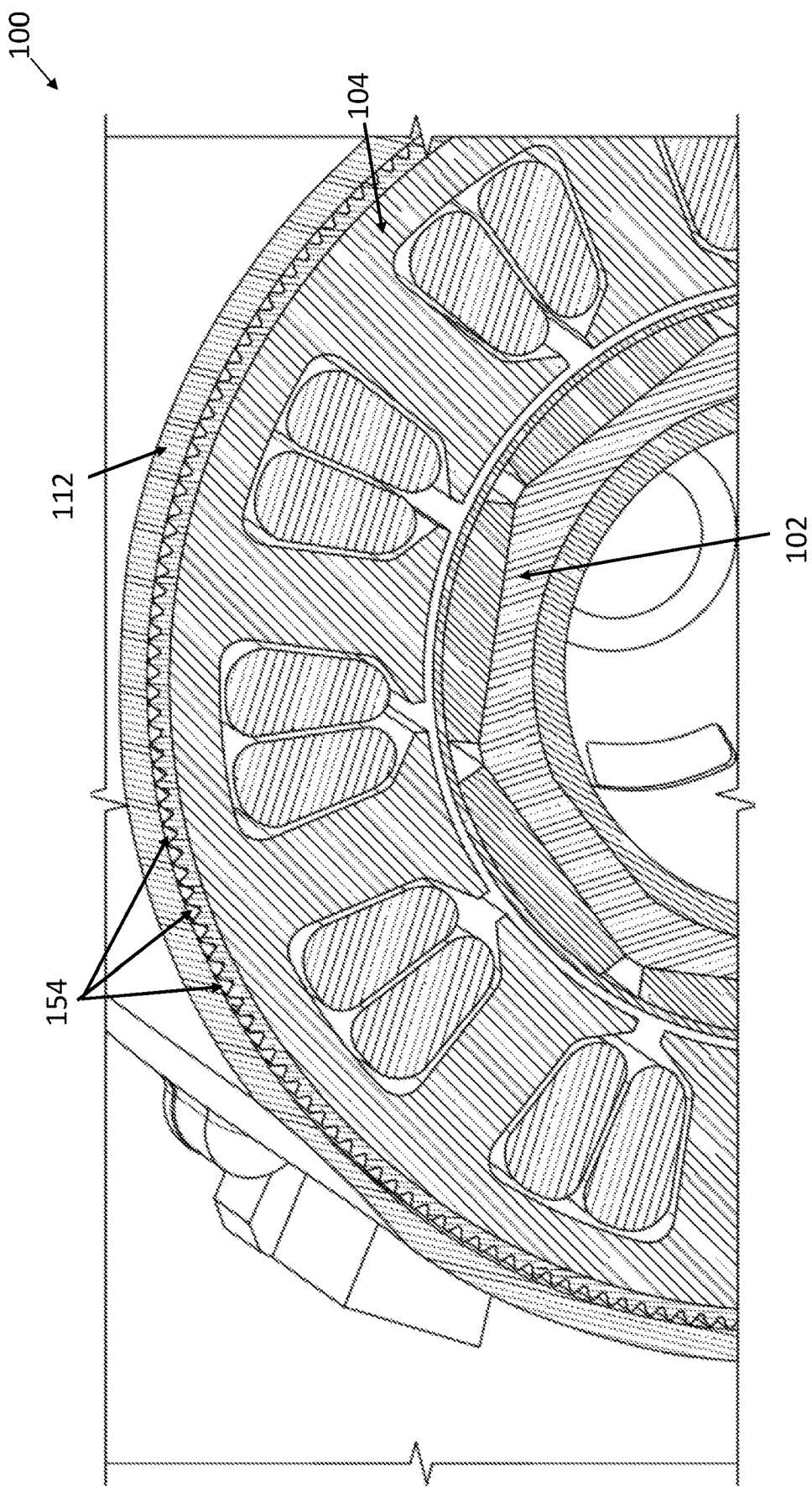

In some embodiments, Channel 142 comprises a plurality of annular passages 152 and axial passages 154. FIG. 1H illustrates a cross section of FIG. 1G taken at 'E-E', which passes through a single annular passage 152—the annular passage 152 closest to bearing 114. As can be seen, annular passage 152 is defined between the central portion 112 of housing 106 and the stator 104 and forms an annulus around the axis. Further, a plurality of axially running passages 154 are defined around a periphery of the stator 104. Cooling fluid may flow from the channel 134 in an end 108 of housing 106 to annular passage 152 of channel 142 that supplies the cooling fluid to the axial passages 154. Cooling fluid flows axially along these passages 154 to the next annular passage. As can be seen in FIG. 1I, a cross section taken at 'F-F' between the left most and center annular passages 152 as shown in FIG. 1G, a radially inward surface of central portion 112 of housing 106 has moved inward from its position as shown in FIG. 1H, thereby forcing the cooling fluid to flow through axial passages 154.

Figure 1J:
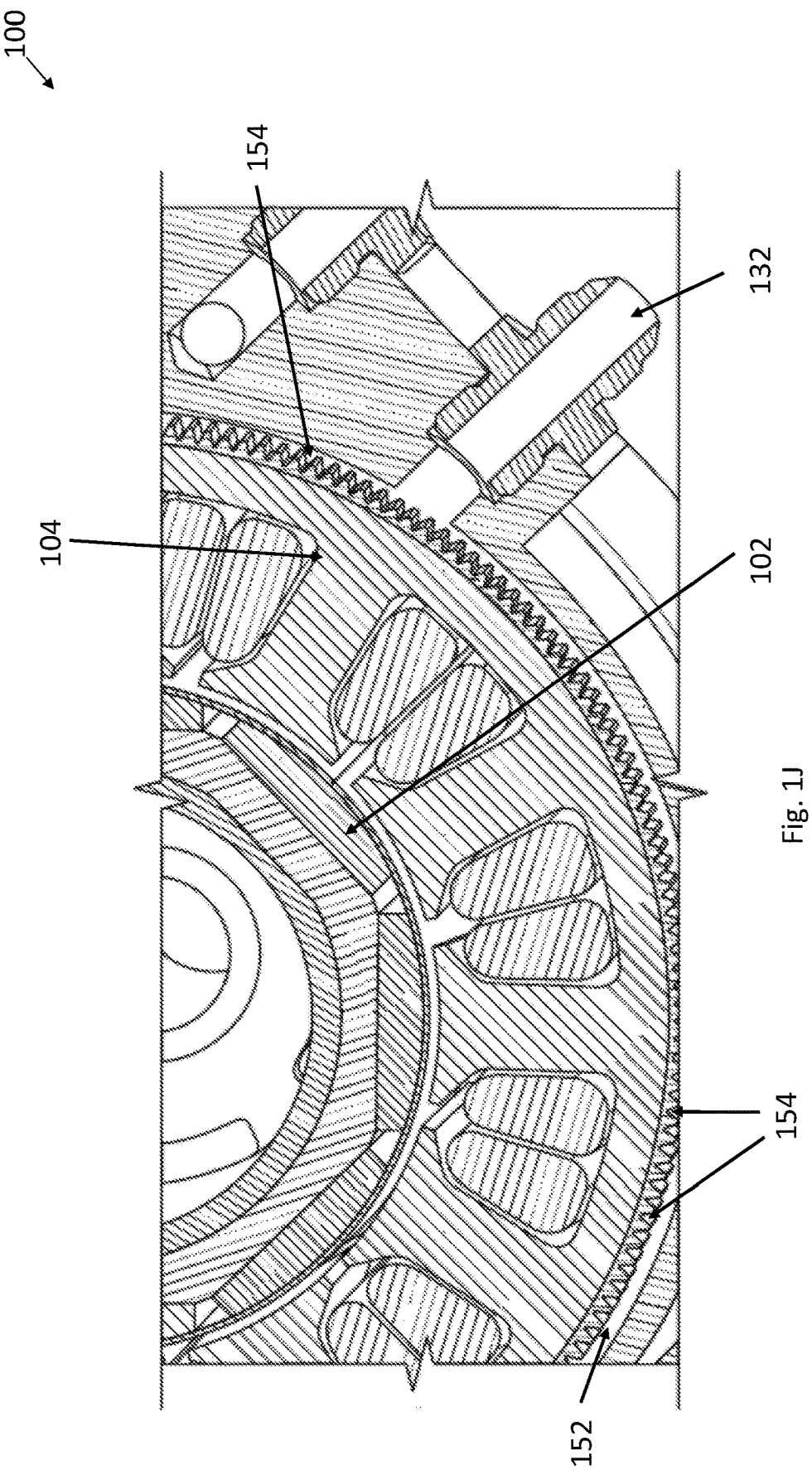

FIG. 1J illustrates the cross section of FIG. 1G taken at 'G-G'. This shows the center annular passage 152. Cooling fluid from the axial passages 154 flows to this center annular passage 152 and it may flow circumferentially around the axis until it arrives at the cooling fluid outlet 132.

With reference back to FIG. 1G, the cooling fluid may flow from cooling fluid inlet 130 to channels 134 (one each in end 108 and end 110), radially inward toward bearings 114 and 116, around the channel 134 annular passage in close proximity to bearings 114 and 116, radially outward to channel 142, through the annular passages 152 closest to the ends 108 and 110, through axial passages 154, and finally around the center annular passage 152 to the cooling fluid outlet 132. The center annular passage 152 may be located at a point proximate to a midpoint between the housing 106 ends 108 and 110.

While FIGS. 1G to 1J have been described as having three annular passages 152, it should be recognized that any number of annular passages (or axial passages) may be used.

Figure 4A:
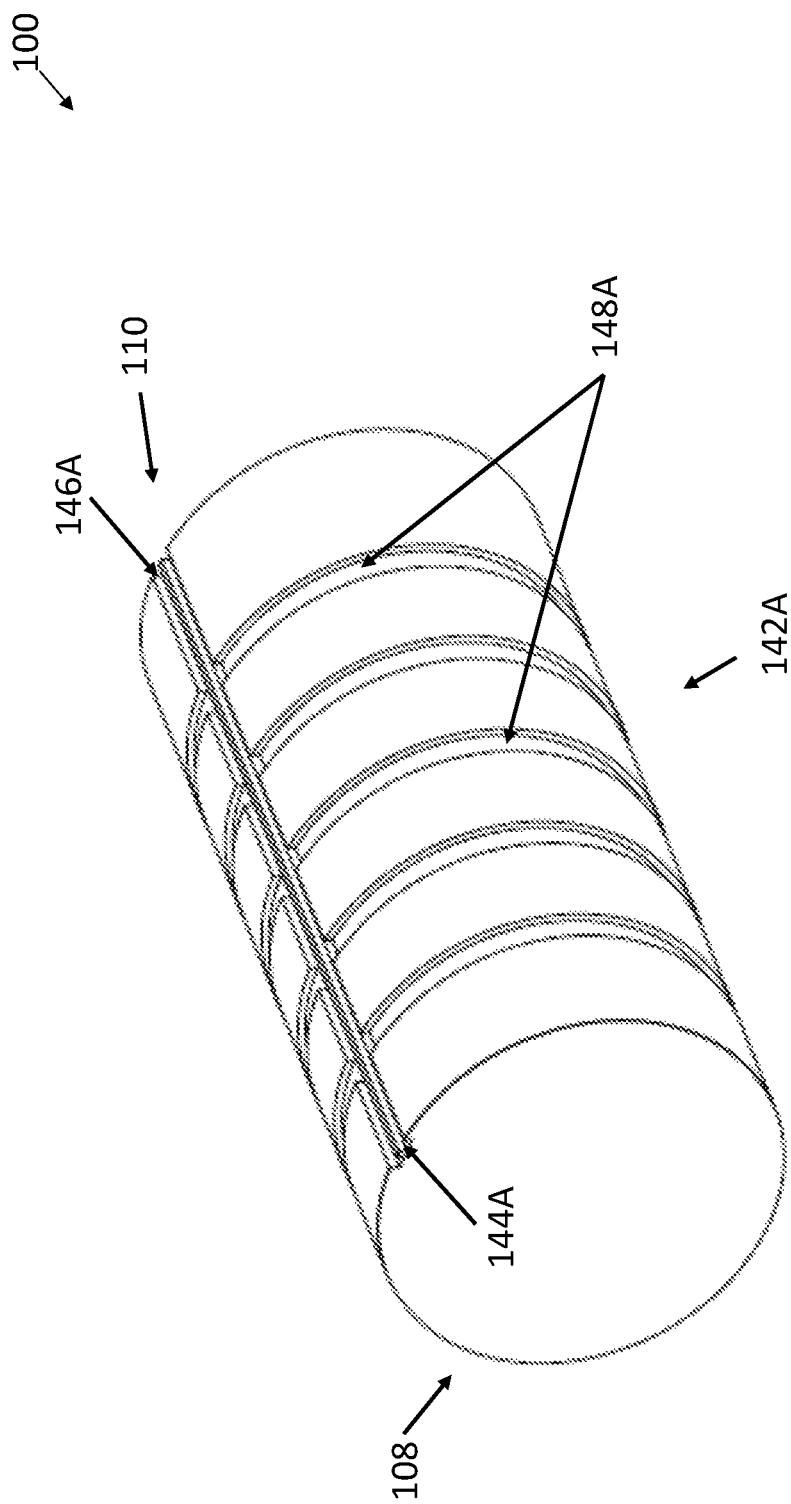
FIGS. 4A to 4C illustrate cooling-fluid channels in accordance with some embodiments.

In accordance with some embodiments, a channel 142A for providing cooling fluid to the electric power generating components of generator 100 is provided in FIG. 4A. The channel 142A may comprise an inlet manifold 144A, an outlet manifold 146A, and a plurality of channels 148A running therebetween. Inlet manifold 144A may be in fluid communication with the channel 134 such that the manifold 144A receives the cooling fluid from the ends 108, 110 of housing 106. From manifold 144A, cooling fluid flows through channels 148A around a circumference of the generator 100, thereby removing heat from generator 100, and, in particular, from the stator 104. Channels 148A may be parallel to one another and perpendicular to the axis of generator 100. After flowing around the circumference, the cooling fluid is provided to outlet manifold 146A, which gathers the cooling fluid and provides it to cooling fluid outlet 132.

Figure 4B:
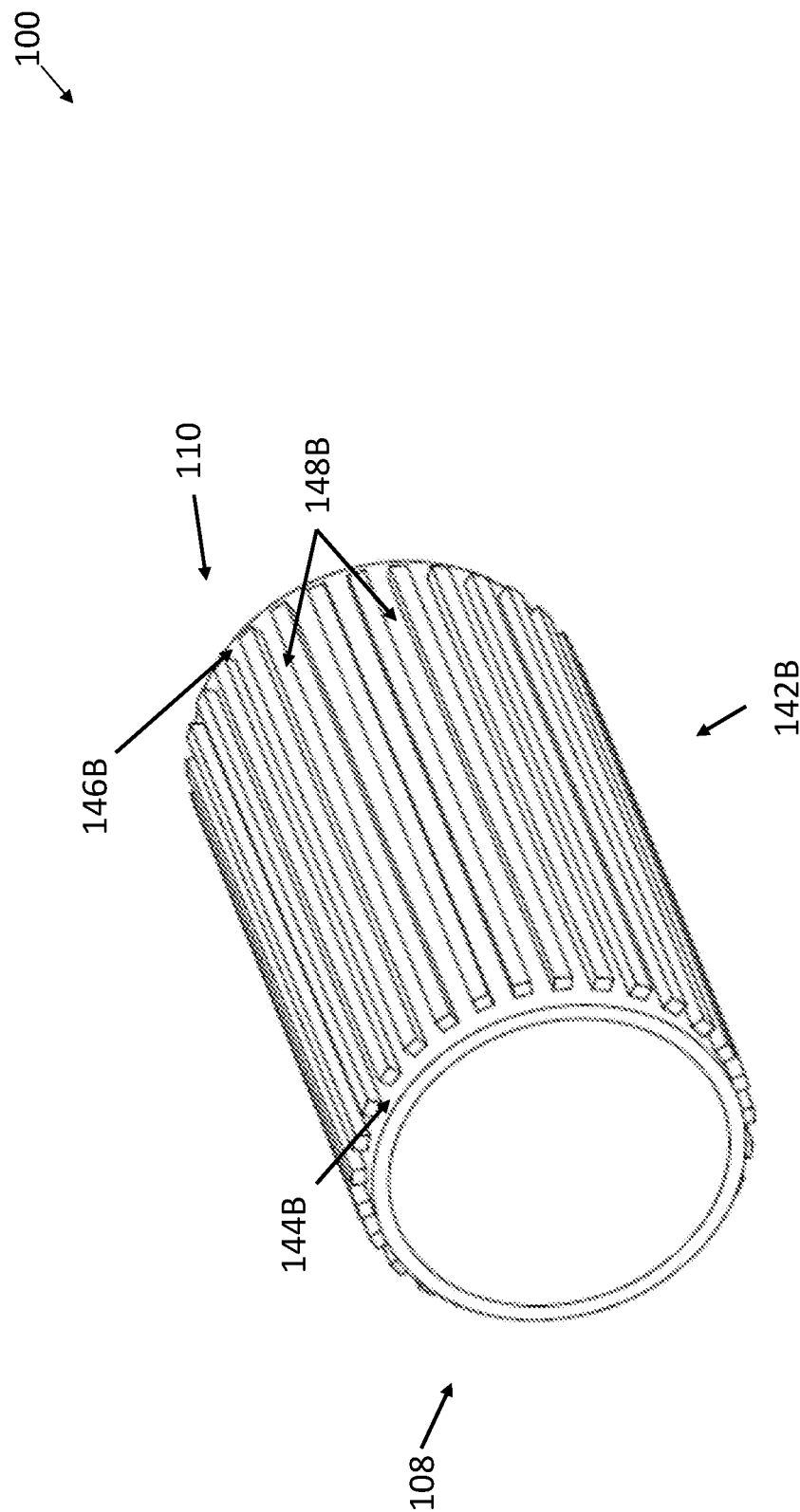

In accordance with some embodiments, a channel 142B for providing cooling fluid to the electric power generating components of generator 100 is provided in FIG. 4B. Channel 142B may comprise an inlet manifold 144B, an outlet manifold 146B, and a plurality of cooling-fluid channels 142B flowing therebetween. Inlet manifold 144B may define an annular passage around the circumference of the generator 100 near one end, e.g., end 108, of housing 106. Inlet manifold 144B may be in fluid communication with the channel 134 such that the manifold 144B receives the cooling fluid from ends 108 of housing 106. Cooling fluid flows around the manifold 144B and is provided to channels 142B. Channels 142B are parallel with one another and the axis 'A' of generator 100. As cooling fluid flows in Channel 142B, heat from the generator 100, and, in particular, stator 104, is absorbed by the cooling fluid. The cooling fluid may be provided to an outlet manifold 146B that forms an annular passage around the circumference of the generator 100. Outlet manifold 146B may provide the cooling fluid to a channel, e.g., channel 134, in end 110 of housing 106 to providing cooling fluid to bearing 116. After cooling bearing 116, the fluid may be provided to an outlet 132.

Figure 4C:
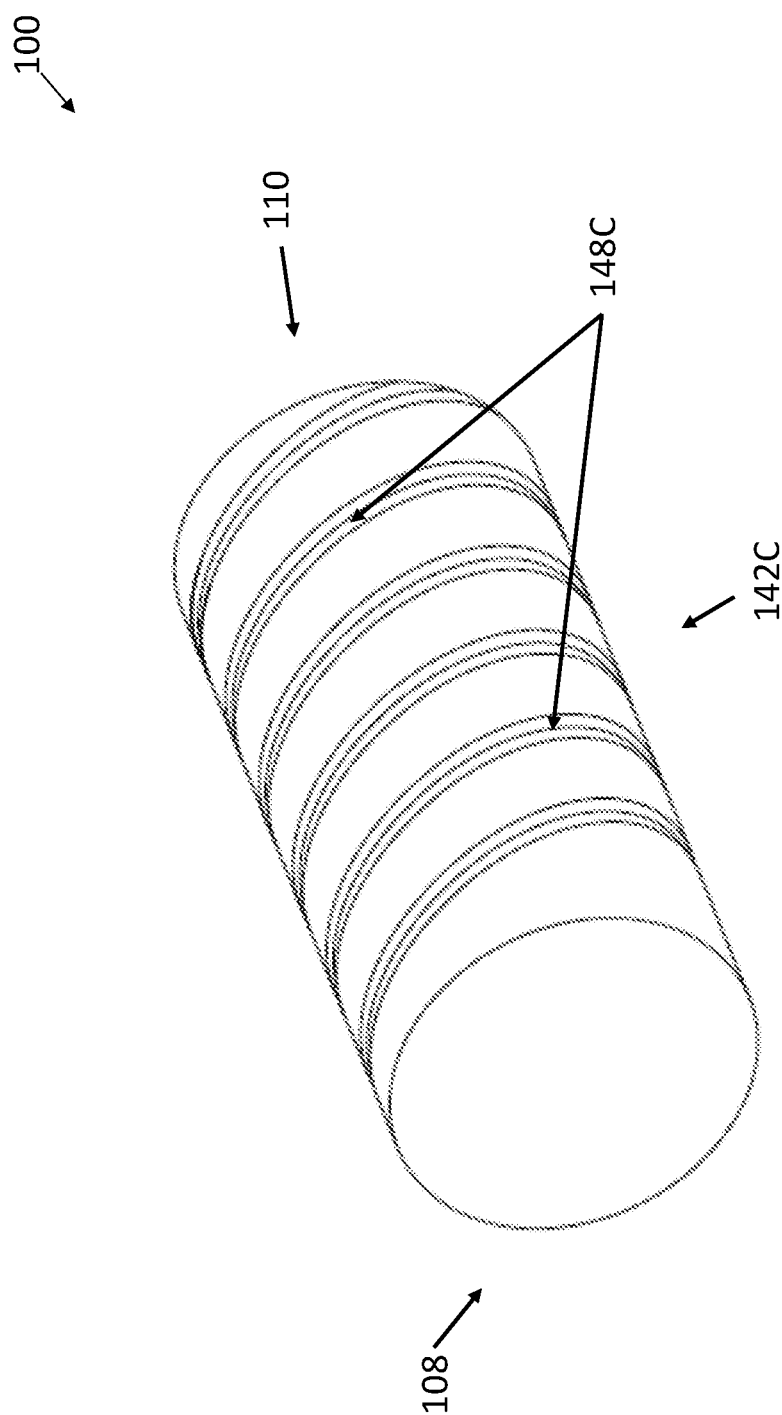

In accordance with some embodiments, a cooling-fluid channel 142C is provided in FIG. 4C. Channel 142C may be similar to channel 142B, however, channels 148C spiral around the circumference of generator 100, rather than proceed in an axial-only direction like channels 148B, at a substantially constant radius. Channel 142C may be provided with an inlet and/or outlet manifold, or be provided with a single, or multiple, point of coupling to the channels, e.g., channel 134, in housing 106 ends 108 and 110. Outlet 132 may be located at an approximate midpoint of generator 100, or at a location proximate to an axial end.

While many of the above embodiments have described fluid inlet 130 and 132 as being at a particular location, it should be understood that there is flexibility in the location of these components and in the order that components are cooled. For example, an inlet 130 may be located at one axial end, e.g., 108, cooling bearing 114, flow radially outwardly, in channel 142 around the stator 104 along its length, flow radially inward to bearing 116, and then exist with outlet 132. In some embodiments, inlet 130 and outlet 132 may be located radially outward of housing 106, either on the same or opposite sides of the housing 106. In some embodiments, inlet 130 and outlet 132 may be located proximate to one another near an axial end of generator 100. In some embodiments, the inlet 130 and outlet 132 may be located proximate to the axis 'A' near an axial end of housing 106

In some embodiments, bearings 116 and 114 are preferentially cooled by the cooling fluid in comparison to the stator 104. Preferential may refer either the order (preferred meaning earlier), or a configuration that absorbs more heat from the bearings than from the electric current generating components.

In some embodiments, the cooling fluid is a fuel, e.g., a hydrocarbon fuel, hydrogen, etc., used by the prime mover. In such embodiments, the fuel, heated by the generator 100, may be supplied directly to the prime mover (e.g., its combustion chamber), or it may be returned to a storage tank. In some embodiments, cooling fluid is any fluid capable of removing heat from generator 100, e.g., water, oil, refrigerant, etc.

In some embodiments, the cooling fluid may be oil, refrigerant, or any other suitable fluid.

In some embodiments, the inner race 118 of bearings 114, 116 may also be cooled by, e.g., an airflow provided by a series of holes in the generator 100 housing 106. In some embodiments, a barrier coating or thermal-insulating sleeve (neither displayed) may be disposed between a bearing and the component to which it is attached, e.g., the rotor. This may prevent or reduce the rate of heat transfer from the electric-power generating components to the inner race 118 of the bearings. In some embodiments, the barrier coating or sleeve may be integral to the rotor.

In accordance with some embodiments, generator 100 may be a motor generator capable of providing either a mechanical or electric power output.

In accordance with some embodiments, a method 600 of operating and cooling a generator 100 is provided in FIG. 6. The generator 100 may be that as described above. The method may comprise providing a cooling fluid to an inlet, which may be inlet 130 as described above, as shown in Block 602. From the cooling-fluid inlet, the cooling fluid is provided to one or more cooling-fluid channels, as shown in Block 604, which may be any of the cooling fluid channels or passages (e.g., 134, 142, 156, etc.) as described above. From the one or more cooling-fluid channels, the cooling fluid is provided to a cooling-fluid outlet, e.g., outlet 132, as shown in block 606. The cooling fluid may then be provided to, e.g., a combustor or a storage tank or other components as described above.

Although examples are illustrated and described herein, embodiments are nevertheless not limited to the details shown, since various modifications and structural changes may be made therein by those of ordinary skill within the scope and range of equivalents of the claims.

What is claimed is:

1. An electric starter-generator, comprising:
a rotor having an axis of rotation;
a housing having a first end, a second end, and a center portion extending from the first end to the second end, said center portion located radially outward of said rotor;
a first enclosed bearing rotationally coupling said rotor to said first end of said housing;
a second enclosed bearing rotationally coupling said rotor to said second end of said housing, wherein each of said first and second enclosed bearings comprises an inner race coupled to said rotor, an outer race coupled to said housing, and a plurality of rolling-element bearings between and in rotational contact with the inner and outer races; and
a stator rigidly coupled to said housing,
a cooling-fluid flow path comprising:
  a cooling-fluid entrance;
  a cooling-fluid exit; and
  a first cooling-fluid channel disposed in the first end of the housing and a second cooling-fluid channel disposed in the second end of the housing, the first cooling-fluid channel and the second cooling-fluid channel in fluid communication with said cooling-fluid entrance and cooling-fluid exit, wherein at least a portion of said first cooling-fluid channel is defined by a first fluid-tight coupling of said housing and a first sleeve radially surrounding said outer race of said first enclosed bearing, and at least a portion of the second cooling-fluid channel defined by a second fluid-tight coupling of said housing and a second sleeve radially surrounding said outer race of the second enclosed bearing, said portion of the first cooling-fluid channel and said portion of the second cooling-fluid channel each forming an annular passage of the cooling-fluid channels about said axis, said portion of the first cooling-fluid channel and said portion of the second cooling-fluid channel each comprising:
    a radially inner surface defined by said first sleeve or said second sleeve respectively;
    a radially outer surface define by said housing; and
    two axial surfaces extending from said radially inner surface to said radially outer surface, wherein both of said radially inner and outer surfaces extend from one of said two axial surfaces to the other of said two axial surfaces without interruption,
    wherein said two axial surfaces extend a distance from said radially inner to outer surfaces that is less than a distance from one of said two axial surfaces to the other of said two axial surfaces,
wherein the cooling-fluid flow path extends radially inward from the cooling-fluid entrance to the first cooling-fluid channel and to the second cooling-fluid channel, further extending radially inwards from the first cooling-fluid channel and from the second cooling-fluid channel towards the first enclosed bearing and the second enclosed bearing respectively, around the annular passages of the cooling fluid channels respectively surrounding the first enclosed bearing and the second enclosed bearing,
wherein the cooling-fluid flow path further extends radially outward from each respective one of the first cooling-fluid channel and the second cooling-fluid channel to a third cooling-fluid channel radially outward of and in thermal communication with the stator, the third cooling-fluid channel comprising a plurality of annular passages and a plurality of axial passages defined between the center portion of the housing and the stator, the cooling-fluid flow path extending from the first cooling-fluid channel and the second cooling-fluid channel to the annular passages and axial passages of the third cooling-fluid channel.

2. The electric starter-generator of claim 1, wherein said third cooling-fluid channel extends from proximate to said first end of said housing to said second end of said housing.

3. The electric starter-generator of claim 1, wherein said third cooling-fluid channel comprises a plurality of channels parallel with one another and with said axis.

4. The electric starter-generator of claim 1, wherein said third cooling-fluid channel comprises a plurality of channels parallel with one another and perpendicular to said axis.

5. The electric starter-generator of claim 1, wherein said third cooling-fluid channel comprises a plurality of channels that spiral around said axis at a substantially constant radius.

6. The electric starter-generator of claim 1, wherein said stator is in thermal communication with at least one of the first cooling-fluid channel or said second cooling-fluid channel.

7. The electric starter-generator of claim 1, wherein each of said cooling-fluid entrance and said cooling-fluid exit are located on a radially outer surface of the housing at a position proximate to a midpoint between said first and second ends of said housing.

8. The electric starter-generator of claim 1, wherein each of said cooling-fluid entrance and said cooling-fluid exit are located at a position proximate to one of said first and second ends of said housing.

9. The electric starter-generator of claim 8, wherein each of said a cooling-fluid entrance and said a cooling-fluid exit are located at a position proximate to a radial center of one of said first and second ends of said housing.

10. The electric starter-generator of claim 1, wherein said first or second sleeve comprises fins.

11. The electric starter-generator of claim 1, wherein said first cooling-fluid channel or said second cooling-fluid channel comprises two cooling-fluid inlets and two cooling-fluid outlets.

12. The electric starter-generator of claim 1, wherein the cooling fluid is fuel.

13. An electric starter-generator, comprising:
a rotor having an axis of rotation;
a housing having a first end, a second end, and a center portion extending from the first end to the second end, said center portion located radially outward of said rotor;
a first enclosed bearing rotationally coupling said rotor to said first end of said housing;
a second enclosed bearing rotationally coupling said rotor to said second end of said housing, wherein each of said first and second enclosed bearings comprises an inner race coupled to said rotor, an outer race coupled to said housing, and a plurality of rolling-element bearings between and in rotational contact with the inner and outer races; and
a stator rigidly coupled to said housing,
a cooling-fluid flow path comprising:
  a cooling-fluid entrance;
  a cooling-fluid exit, wherein the cooling-fluid entrance and the cooling-fluid exit are located on a radially outer surface of the housing at a position proximate to a midpoint between the first end and the second end of said housing; and a first cooling-fluid channel disposed in the first end of the housing and a second cooling-fluid channel disposed in the second end of the housing, the first cooling-fluid channel and the second cooling-fluid channel in fluid communication with said cooling-fluid entrance and cooling-fluid exit, wherein at least a portion of said first cooling-fluid channel is defined by a first fluid-tight coupling of said housing and a first sleeve radially surrounding said outer race of said first enclosed bearing, and at least a portion of the second cooling-fluid channel defined by a second fluid-tight coupling of said housing and a second sleeve radially surrounding said outer race of the second enclosed bearing, said portion of the first cooling-fluid channel and said portion of the second cooling-fluid channel each forming an annular passage of the cooling-fluid channels about said axis, said portion of the first cooling-fluid channel and said portion of the second cooling-fluid channel each comprising:
  a radially inner surface defined by said first sleeve or said second sleeve respectively;
  a radially outer surface define by said housing; and
  two axial surfaces formed by the housing and extending from said radially inner surface to said radially outer surface, wherein both of said radially inner and outer surfaces extend from one of said two axial surfaces to the other of said two axial surfaces without interruption, wherein said radially outer surface is located radially inward of said stator,
wherein the cooling-fluid flow path extends radially inward from the cooling-fluid entrance to the first cooling-fluid channel and to the second cooling-fluid channel, further extending radially inwards from the first cooling-fluid channel and from the second cooling-fluid channel towards the first enclosed bearing and the second enclosed bearing respectively, around the annular passages of the cooling fluid channels respectively surrounding the first enclosed bearing and the second enclosed bearing,
wherein the cooling-fluid flow path further extends radially outward from each respective one of the first cooling-fluid channel and the second cooling-fluid channel to a third cooling-fluid channel radially outward of and in thermal communication with the stator, the third cooling-fluid channel comprising a plurality of annular passages and a plurality of axial passages defined between the center portion of the housing and the stator, the cooling-fluid flow path extending from the first cooling-fluid channel and the second cooling-fluid channel to the annular passages and axial passages of the third cooling-fluid channel.

14. A method of cooling an electric generator, said electric generator having
  a rotor having an axis of rotation,
  a housing having a first end and a second end,
  a first enclosed bearing rotationally coupling the rotor to the first end of the housing,
  a second enclosed bearing rotationally coupling the rotor to the second end of the housing, wherein each of the first enclosed bearing and the second enclosed bearing comprise an inner race coupled to said rotor, an outer race coupled to said housing,
  a cooling-fluid flowpath comprising a cooling-fluid entrance, a cooling-fluid exit, and
  a plurality of cooling-fluid channels in fluid communication with said cooling-fluid entrance and cooling-fluid exit, said plurality of cooling-fluid channels comprising a first cooling-fluid channel in the first end of the housing, a second cooling-fluid channel in the second end of the housing, and a third cooling-fluid channel, wherein at least a portion of the first cooling-fluid channel is defined by a first fluid-tight coupling of the housing and a first sleeve radially surrounding the outer race of the first enclosed bearing, and at least a portion of the second cooling-fluid channel is defined by a second fluid-tight coupling of the housing and a second sleeve radially surrounding the outer race of the second enclosed bearings, the portion of the first cooling-fluid channel and the portion of the second cooling-fluid channel each forming an annular passage about said axis of the cooling-fluid channels, the first cooling-fluid channel disposed radially outward of a portion of and in thermal communication with the first enclosed bearing at a first end of said generator, and the second cooling-fluid channel disposed radially outward of a portion of and in thermal communication with the second enclosed bearing at a second end of the generator, said annular passage of the first cooling-fluid channel and said annular passage of the second cooling-fluid channel configured to maintain a cooling fluid in said first cooling-fluid channel and the second cooling-fluid channel radially inward of a stator of said generator, said method comprising:
  providing a cooling fluid to said cooling-fluid entrance;
  flowing said cooling fluid radially inward from the cooling-fluid entrance to the first cooling-fluid channel and the second cooling-fluid channel;
  flowing the cooling fluid radially inwards from the first cooling-fluid channel and from the second cooling-fluid channel towards the first enclosed bearing and the second enclosed bearing respectively;
  flowing the cooling fluid around the annular passage of the first cooling-fluid channel surrounding the first enclosed bearing and around the annular passage of the second cooling-fluid channel surrounding the second enclosed bearing;
  flowing the cooling fluid radially outward from the first cooling-fluid channel and the second cooling-fluid channel to the third cooling-fluid channel in thermal communication with and disposed radially outward of the stator, wherein the third cooling-fluid channel comprises a plurality of annular passages and a plurality of axial passages defined between the center portion of the housing and the stator;
  flowing the cooling fluid from the first cooling-fluid channel and the second cooling-fluid channel through the annular passages and axial passages of the third cooling-fluid channel; and
  removing said cooling fluid from the third cooling-fluid channel via said cooling-fluid exit.

15. The method of claim 14, wherein said third cooling-fluid channel is in thermal communication with said generator and disposed axially outward of said stator.

16. The method of claim 14, further comprising:
  supplying said cooling fluid removed via said cooling-fluid exit to a combustor of an engine.

* * * * *